United States Patent [19]

Schabert et al.

[11] Patent Number: 5,311,563
[45] Date of Patent: May 10, 1994

[54] STORAGE FRAME FOR NUCLEAR REACTOR FUEL ASSEMBLIES

[75] Inventors: Hans-Peter Schabert; Wilfried Horstmann, both of Erlangen; Karl Wasinger, Mulheim am Rhein, all of Fed. Rep. of Germany

[73] Assignee: Siemens Aktiengesellschaft, Munich, Fed. Rep. of Germany

[21] Appl. No.: 962,464

[22] Filed: Oct. 16, 1992

[30] Foreign Application Priority Data

Oct. 16, 1991 [DE] Fed. Rep. of Germany ....... 4134246

[51] Int. Cl.⁵ .............................................. G21C 19/40
[52] U.S. Cl. .................................................... 376/272
[58] Field of Search ......................................... 376/272

[56] References Cited

U.S. PATENT DOCUMENTS

| | | | |
|---|---|---|---|
| 4,024,406 | 5/1977 | Bevilacqua | 376/272 |
| 4,039,842 | 8/1977 | Mollon | 376/272 |
| 4,088,897 | 5/1978 | Soot | 376/272 |
| 4,119,859 | 10/1978 | Karzmar et al. | 376/272 |
| 4,124,445 | 11/1978 | Mollon | 376/272 |
| 4,143,276 | 3/1979 | Mollon | 376/272 |
| 4,243,889 | 1/1981 | Weber | 376/272 |
| 4,567,015 | 1/1986 | Bosshard | 376/272 |
| 4,630,738 | 12/1986 | Bosshard | 376/272 |
| 4,695,424 | 9/1987 | Flynn | 376/272 |
| 4,820,472 | 4/1989 | Machado et al. | 376/272 |

FOREIGN PATENT DOCUMENTS

| | | |
|---|---|---|
| 0071364 | 2/1983 | European Pat. Off. . |
| 0220931 | 5/1987 | European Pat. Off. . |
| 0385187 | 9/1990 | European Pat. Off. . |
| 3519789 | 4/1986 | Fed. Rep. of Germany . |

*Primary Examiner*—Daniel D. Wasil
*Attorney, Agent, or Firm*—Herbert L. Lerner; Laurence A. Greenberg

[57] ABSTRACT

A storage frame for nuclear reactor fuel assemblies includes a base plate. A plurality of shafts stand erect on and are secured to the base plate. The shafts each have a substantially rectangular cross section and are disposed diagonally opposite one another in a checkerboard-type configuration. The shafts have longitudinal edges adjacent one another with an offset defining a gap therebetween. At least two connecting elements join at least some of the diagonally opposite shafts together along the longitudinal edges by spanning the gap. The at least two connecting elements include at least one first connecting element being associated with a respective pair of the longitudinal edges and have a high rigidity in a first direction parallel to the base plate. The at least two connecting elements also include at least one second connecting element being associated with a respective pair of the longitudinal edges and having a high rigidity in a second direction parallel to the base plate.

19 Claims, 6 Drawing Sheets

STORAGE FRAME FOR NUCLEAR REACTOR FUEL ASSEMBLIES

The invention relates to a storage frame for nuclear reactor fuel assemblies.

For both technical and economic reasons, the temporary storage of spent fuel assemblies in a pressurized or boiling water reactor requires the most optimal possible use of a storage space available inside a fuel assembly storage pit. The storage frame should not only have adequate mechanical stability and neutron-absorbing properties but also should require as little space for itself as possible, for the sake of a high loading density for spent fuel assemblies.

U.S. Pat. No. 4,119,859 discloses a storage frame for spent fuel assemblies in which one absorber shaft is provided for only every other position in the frame. The absorber shafts are disposed diagonally opposite one another and form a checkerboard-like pattern, so that each two side walls of an absorber shaft that form a common longitudinal edge are associated with two side walls of an adjacent absorber shaft that likewise form a common longitudinal edge. The absorber shafts are joined to one another with sheet-metal strips or angle elements in the region of their longitudinal edges that adjoin one another. Given a suitable selection of their geometric configuration, using sheet-metal strips or angle elements instead of cruciform connecting elements, facilitates installation of the storage frame in stages, because welding the connecting elements to the side walls can be performed in each case from a freely accessible side over the entire height of the absorber shaft. Such sheet-metal strips or angle elements, which are distributed over a relatively great height of the absorber shafts, have the effect of transmitting vertical thrust, in particular, from one shaft to another, so that bending of the entire frame under the intrinsic weight of the shafts is lessened. A horizontal support grid, that is also disposed in the upper part of the storage frame, and is assembled from interlocking strips of heavy metal plate, is provided in order to withstand horizontal transverse forces in the upper portion of the storage frame. In the support grid, only every other grid space is provided with an absorber shaft. The thickness of the heavy metal plate strips of the support grid results in a mutually offset configuration of absorber shafts, so that the adjacent, mutually parallel side walls of opposed absorber shafts are not aligned with one another. The clear span or clearance inside the support grid must also be dimensioned in accordance with the external dimensions of the absorber shafts, resulting in a large spacing for the intermediate positions not occupied by absorber shafts, between the fuel assembly and the absorber walls of the absorber shafts surrounding it. The result is that the existing storage space cannot be optimally utilized, and the free-standing fuel assemblies are stored with excessive lateral play in the intermediate position. Moreover, the protrusions formed both by the sheet-metal angle elements or strips and in particular by the support grid, present an obstacle for loading fuel assemblies into the absorber shafts or into the intermediate positions in the support grid that are not provided with absorber shafts, or for unloading them from the shafts or positions, and a danger exists of the fuel assemblies catching in the storage frame as they move in or out.

It is accordingly an object of the invention to provide a storage frame for nuclear reactor fuel assemblies, which overcomes the hereinafore-mentioned disadvantages of the heretofore-known devices of this general type and in which high stability of the entire shaft construction is assured despite easier installation of the frame. Moreover, the object is directed to creating a storage frame by having a structure which makes a high loading density possible, while exploiting intermediate positions as well. A subordinate object of the invention is to construct the fuel assembly storage frame in such a way that catching of the fuel assemblies in the shafts and intermediate positions during unloading or loading can be practically precluded.

With the foregoing and other objects in view there is provided, in accordance with the invention, a storage frame for nuclear reactor fuel assemblies, comprising a base plate; a plurality of shafts standing erect on and being secured to the base plate, the shafts each having a substantially rectangular cross section and being disposed diagonally opposite one another in a checkerboard-type configuration, and the shafts having longitudinal edges adjacent one another with an offset defining a gap therebetween; and at least two connecting elements joining at least some of the diagonally opposite shafts together along the longitudinal edges by spanning the gap; the at least two connecting elements including at least one first connecting element being associated with a respective pair of the longitudinal edges and having a high rigidity in a first direction parallel to the base plate; and the at least two connecting elements including at least one second connecting element being associated with a respective pair of the longitudinal edges and having a high rigidity in a second direction parallel to the base plate.

Since at least two connecting elements are provided for connecting each two shafts along their adjoining longitudinal edges, and these connecting elements have a high rigidity in directions that are different from one another but parallel to the base plate, internal transverse forces acting upon the storage frame can be absorbed without requiring an additional support grid in the upper region of the storage frame. Due to the absence of the support grid, loading into the spaces that are not provided with shafts in the storage frame can also be performed, thereby forming intermediate positions or spaces for fuel assemblies.

High rigidity is always attained whenever the horizontal transverse force acts entirely or nearly parallel to one of the flat sides of a connecting element, because in that case it is primarily longitudinal strains that arise in the connecting elements. Even thin-walled sheet metal has high deformation resistance to these longitudinal strains. Forces acting transversely to the flat sides of a thin-walled metal sheet would cause major bending strains in the weld seams and greatly increased yielding in that direction. The absorption of these forces is then effected by the second connecting element which is provided for each shaft connection. This element is also a thin-walled sheet, for example, and is disposed at an angle from the first connecting element, which once again is a thin-walled metal sheet, for example.

In accordance with another feature of the invention, an angle between 70° and 90° is described between the first direction and the second direction. A particularly high capacity on the part of the storage frame for absorbing transverse forces from arbitrary directions can be attained in this way.

In accordance with a further feature of the invention, the first connecting elements are each welded to one side wall of one shaft and to a side wall associated with an opposed shaft and are disposed in a lower region of the shafts, and the second connecting elements are welded at least to the other side walls that are associated with one another of opposed shafts and are provided in the upper region of the shafts.

As a result, it is possible to provide a configuration of the first connecting elements in the lower region of the shafts that assures good accessibility of the weld seams when the storage frame is assembled, in the course of which the shafts are welded together in succession through the connecting elements. The second connecting elements disposed in the upper region can then be welded-in afterward, beginning at the top of the storage frame.

In accordance with an added feature of the invention, the length of the lower region provided with the first connecting elements is at least three-quarters of the total height of the shafts. In the lower region of the shafts, either a one-piece first connecting element, which is welded over its entire length to the side walls of the adjacent shafts with or without interruptions, or a plurality of first connecting elements that are spaced apart from one another, may be provided.

The first connecting elements are suitably either sheet-metal strips or sheet-metal angle elements, each of which join only one side wall of a shaft to one side wall of an adjacent shaft and thus enable free accessibility upon installation of the storage frame.

In particular, in accordance with an additional feature of the invention, the first connecting elements are sheet-metal strips disposed between the longitudinal edges of the opposed shafts and welded to the mutually parallel side walls thereof.

In accordance with yet another feature of the invention, the first connecting elements extend over the total height of the shafts and are provided in the upper region with a slit for receiving one of the second connecting elements that is likewise strip-like.

In accordance with yet a further feature of the invention, the width of the sheet-metal strips is between 10% and 30% of the length of the sides or of the clear span of the shafts.

In accordance with yet an added feature of the invention, the the second connecting elements have a cross-shaped or cruciform profile and are welded to each of the side walls that are associated with one another.

In accordance with yet an additional feature of the invention, the connecting elements converge in tapered fashion on their ends protruding in a direction from outside axially inward into the interior of the shafts. This is done in order to prevent catching of the fuel assemblies as they move out of or into the shafts.

In accordance with again another feature of the invention, the walls of the shafts are formed of austenitic boron steel with a boron content of up to 2%, and preferably between 1% and 1.6%, and the connecting elements are formed of soft austenitic steel having a carbon content which is less than 0.1%, and preferably less than 0.04%. This assures that if extreme external forces are exerted upon the storage frame, the boron steel shafts will remain virtually undeformed, because the external forces are absorbed, if necessary, by flowing of the connecting elements.

In accordance with again a further feature of the invention, the connecting elements have a wall thickness that is less than the wall thickness of the side walls of the shaft. This is done in order to reliably avoid bending of the boron steel shafts.

In accordance with again an added feature of the invention, the side walls of the shafts have crimps. Due to this feature, the clear span of the spaces surrounded by shafts can practically match the clear span of the shafts. This makes it possible to load the storage frame in such a way that the fuel assemblies are spaced apart from the neutron-absorbing side walls of the shafts by virtually the same distance in all positions in the storage frame.

In accordance with again an additional feature of the invention, the diagonally opposite shafts have spaces therebetween defining intermediate positions, and there is provided an outer wall surrounding the shafts and the spaces, the striplike first connecting elements each being disposed parallel to a part of the outer wall to which they are closest. This produces an onionskin-like pattern with high rigidity parallel to the respective closest outer wall of the storage frame.

In accordance with still another feature of the invention, the flat sides of the connecting elements are disposed at an acute angle relative to the respective side wall welded to each of them. As a result, with crimped shafts, an offset-free configuration of the shafts in the frame is made possible.

In accordance with still a further feature of the invention, the shafts are each welded to a flange plate that is screwed to the base plate. Through the use of this provision, direct weld seams between the side walls of the shafts and the base plate, which are complicated and expensive from a production standpoint, are avoided. Due to the small differences in wall thickness between the flange plate and the side walls of the shafts, the flange plate can be welded to side walls of the shafts in a technically more reliably way and with less tendency toward the formation of weld cracks. Moreover, with this structure, all four walls of the shafts can be welded to the flange plate and thus joined to the base plate in a force-locking manner. That is impossible if a storage frame is to be installed by being welded directly to the base plate, because as the structure is assembled only three of the four side walls of most of the shafts would be accessible for direct welding. A force-locking connection is one which connects two elements together by force external to the elements, as opposed to a form-locking connection which is provided by the shapes of the elements themselves.

In accordance with still an added feature of the invention, there are provided feet for supporting the storage frame, being screwed to the base plate or to reinforcement plates disposed on the base plate.

In accordance with still an additional feature of the invention, there is provided a threaded bore having a coarse thread with an axial play that is at least 0.5 mm, and preferably 1 to 2 mm, for screwing the feet to the base plate. By virtue of the coarse thread, the feet are received in an articulated manner, which assures that all of the feet will rest flat on the bottom of the fuel assembly storage pit. The storage frame is then free-standing, without any lateral fixation to the bottom of the storage pit.

In accordance with another feature of the invention, each respective foot has a threaded shaft or shank and a widened base, as compared to the shaft, and is supported by its base on a bottom plate, and there are provided clamping devices disposed between the bottom plate and the reinforcement plate or the base plate, for clamping the feet in the coarse thread after adjustment of the horizontal position of the base plate.

In accordance with a concomitant feature of the invention, a ratio between half the base width of the foot and a spacing between the base plate and a center point of the threaded bore, is greater than the coefficient of friction between the base plate and the bottom of the storage pit. As a result, in the event of transverse forces acting upon the storage frame, for instance during earthquakes, the entire storage frame can slide along the bottom of the pit, and the feet are prevented from tilting.

Other features which are considered as characteristic for the invention are set forth in the appended claims.

Although the invention is illustrated and described herein as embodied in a storage frame for nuclear reactor fuel assemblies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
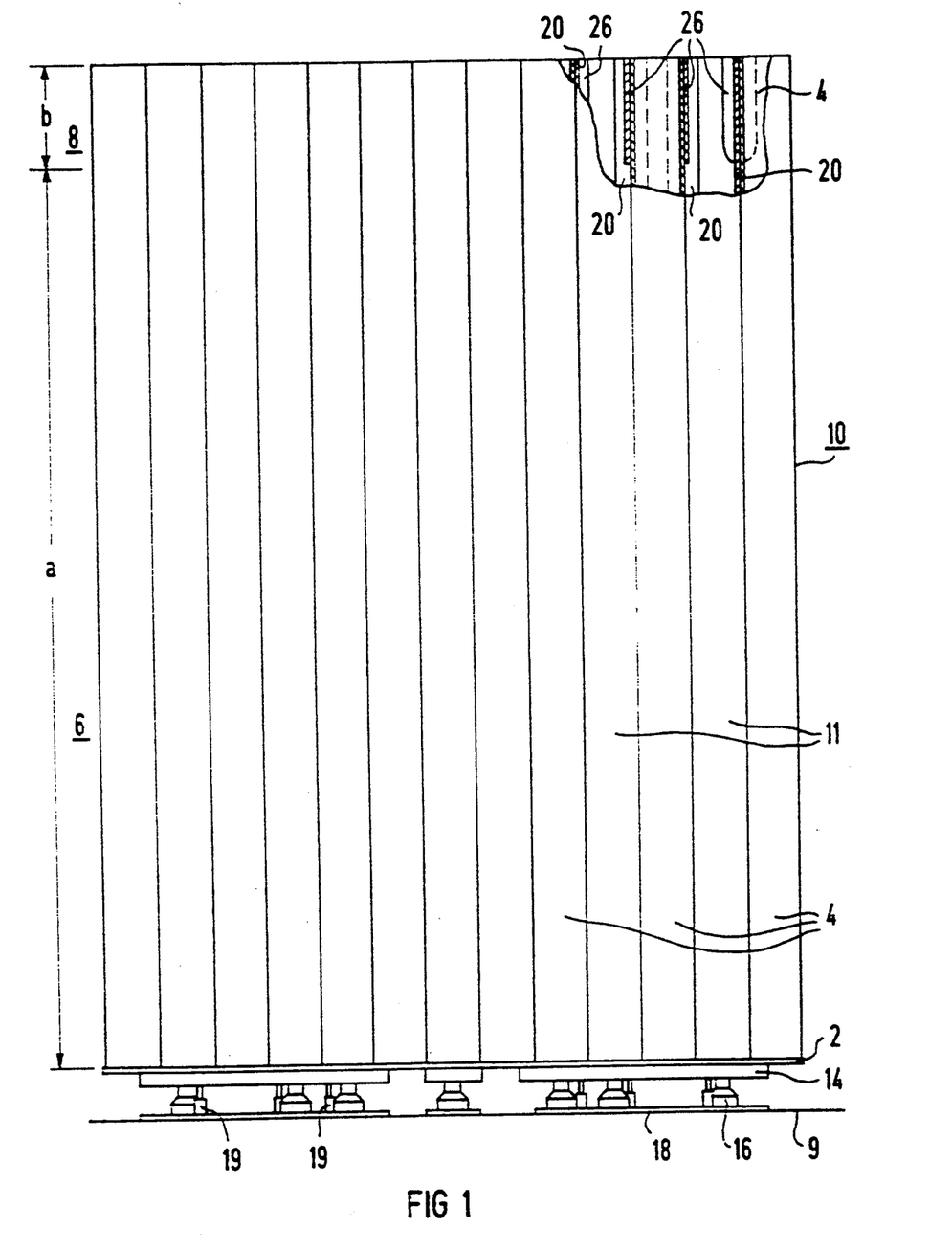
FIG. 1 is a partly broken-away, side-elevational view of a fuel assembly storage frame according to the invention.

Referring now to the figures of the drawing in detail and first, particularly, to FIG. 1 thereof, there is seen a plurality of shafts, hollow columns or tubes 4, each having a substantially rectangular cross section, that are secured upright on a base plate 2 in a storage frame for nuclear reactor fuel assemblies. The shafts 4 are disposed in checkerboard-like fashion on the base plate 2, so that an outer wall 10 of the storage frame, which can be seen in a side view in the drawing, is alternatingly formed by side walls of the shafts 4 and by peripheral plates 11 welded to these side walls.

Reinforcement plates 14 that are provided with feet 16, are disposed on the base plate 2. The feet 16 rest on a bottom 9 of the non-illustrated fuel assembly storage pit through bottom plates 18. The feet 16 are screwed into the reinforcement plates 14 which have a coarse thread with a thread pitch of 6 mm. Between the reinforcement plate 14 and the bottom plate 18, clamping devices or bolts 19 are provided for clamping the feet 16 in the coarse thread. The storage frame rests freely on the bottom 9 of the fuel assembly storage pit, without lateral fixation.

The shafts 4 are joined to one another by respective first and second connecting elements 20 and 26. The upper right-hand portion of the drawing provides a broken-away view of the side walls of the shafts 4 that are disposed in a second row and are located behind the peripheral plates 11. The first connecting elements 20 and the second connecting elements 26 can be seen alternatingly in a plan view of the flat side thereof and in a section through the narrow side thereof, and in the plan view half of each is covered by a shaft 4 located in front of it.

In the example shown in the drawing, the lower, first connecting elements 20 extend over an entire height a+b of the shaft 4, or in other words over a lower region 6 and an upper region 8. In order to enable easy welding of the second connecting elements 26, they extend only in the upper region 8 over the length b, which is less than 25% of the total height a+b of the shafts 4. In the case of a total height of the shafts of approximately 4.5 m, the second connecting elements 26 have a length which is in particular between 300 mm and 500 mm.

The shafts 4 are made of boron steel, with a boron content between 1% and 1.6%, while ductile austenitic steel with a low carbon content is used for the connecting elements.

Figure 2:
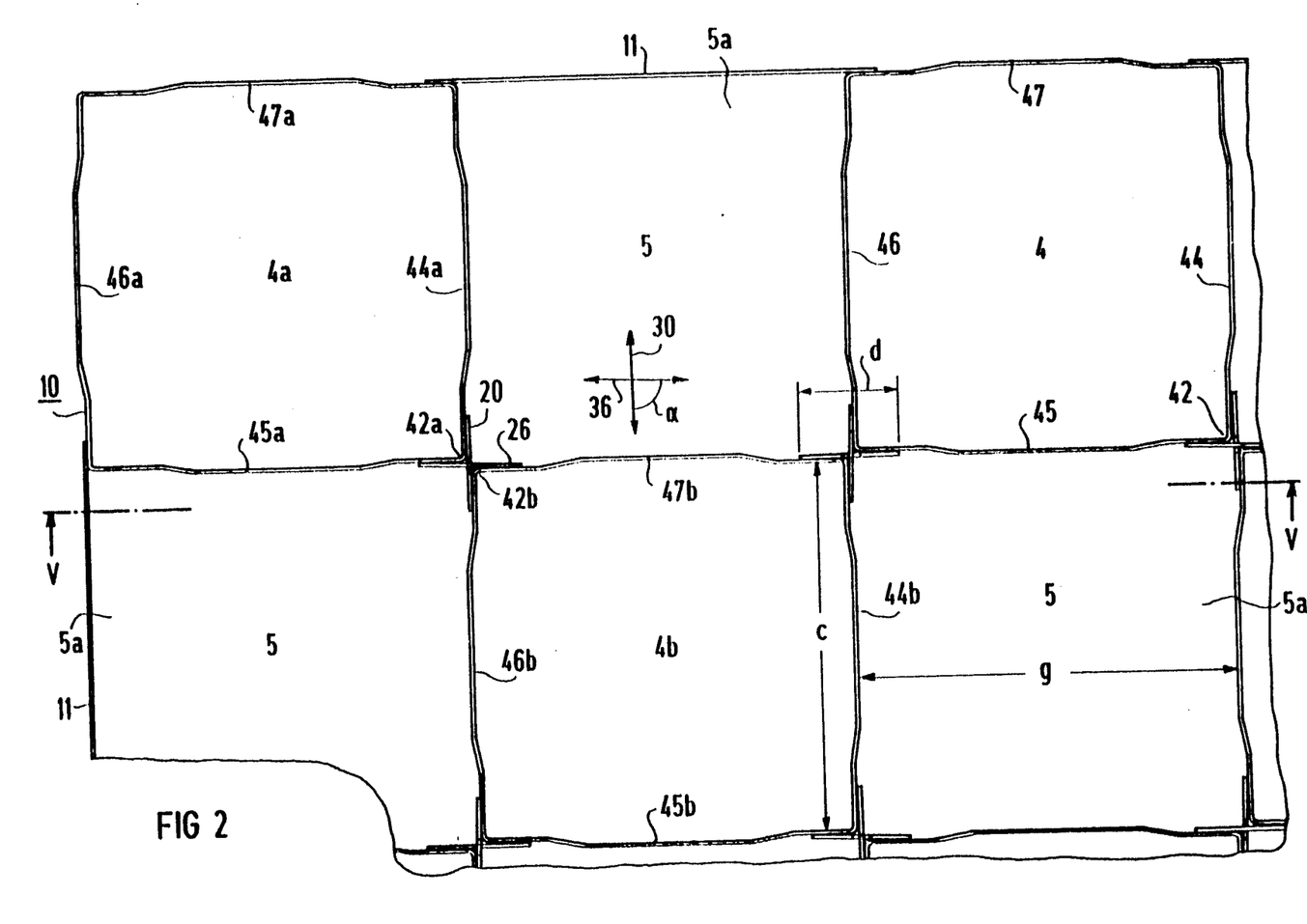
FIG. 2 is a fragmentary, plan view of the storage frame in the region of one of its corners.

As is shown in FIG. 2, the shafts 4 are each disposed diagonally opposite one another, creating a checkerboard-like pattern. This figure shows one corner of a peripheral region of the storage frame. In the peripheral region of the storage frame, three shafts 4 surround a space 5a, which is closed off from the outside by a peripheral plate 11 and serves, in addition to the shafts 4, for receiving a non-illustrated fuel assembly in an intermediate position 5. In the inner region of the storage frame, four shafts 4 surround one space 5a with an intermediate position 5. Side walls 44-47, 44a-47a, 44b-47b of the shaft 4 and shafts 4a, 4b are each crimped outward, so that a clear span or clearance c of the shafts virtually matches a clear span or clearance g of the spaces 5a. This clear span measures approximately 220 mm.

The shafts and side walls are generally identified by reference numerals 4 and 44-47, respectively, and in particular 4a, 4b and 44a-47a, 44b-47b, respectively. Each of the shafts 4 is joined to the shaft 4 opposite it by the first and second connecting elements 20 and 26. Each two side walls 44a and 45a of a shaft 4a that form a common longitudinal edge 42a are associated with two side walls 47b and 46b of the diagonally opposed shafts 4b that form a common longitudinal edge 42b. The first connecting element 20 is in the form of a sheet-metal strip and it connects the side wall 44a and the shaft 4a with the side wall 46b of the shaft 4b, that is virtually parallel to it. The likewise striplike second connecting element 26 connects the side wall 45a of the shaft 4a with the side wall 47b of the shaft 4b.

The first connecting element 20 has a high rigidity in the directions indicated by a double arrow 30 extending parallel to the flat side of the first connecting element 20. The second connecting element 26 has a high rigidity in directions 36 extending virtually perpendicular to the direction 30. An approximately right angle α between these two directions 30 and 36 is preferably between 70° and 90°. It can be seen from the figure that the first and second striplike connecting elements 20 and 26 do not extend exactly parallel and perpendicular to the respective outer wall 10 and side walls 44a, 45a, 46b, and 47b. Instead they each rest on lateral surfaces of the side walls 44a, 45a, 46b and 47b at an acute angle β shown in FIG. 7. This compensates for a requisite offset S1 in the x direction and S2 in the y direction between the shafts 4a and 4b that is required in the region of the longitudinal edges 42a and 42b. The orientation of the offset S1 is parallel to the x axis, and the orientation of the offset S2 is parallel to the y axis of a right-angled axis intersection x-y, which is oriented with its two axes parallel to the respective walls 44, 46 and 45, 47, of the shafts 4. Since the lateral surfaces of the walls 44a, b through 47a, b of the shafts 4a and 4b are crimped outward, this offset S1, S2 is cancelled out again, so that the clear span c of the shafts virtually matches the clear span g of the space 5a or of the intermediate positions 5.

Figure 7:
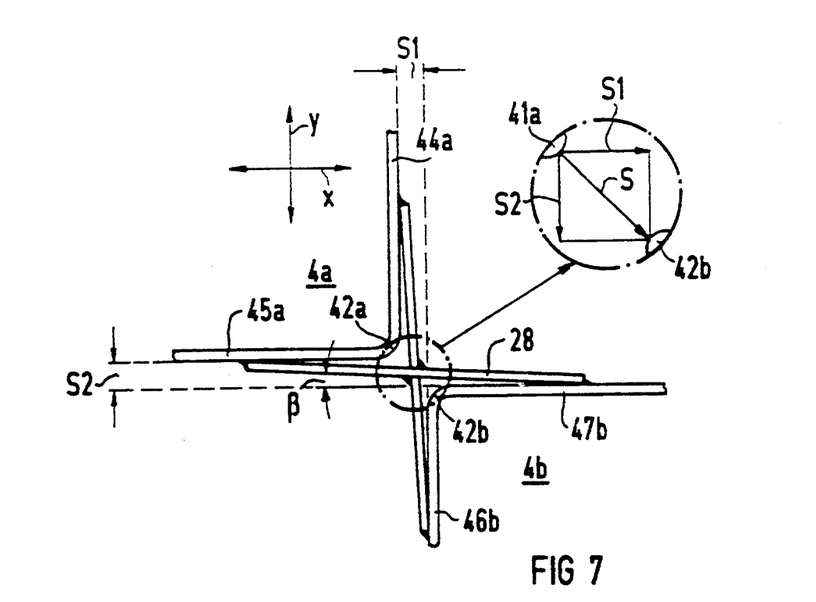
FIG. 7 is an elevational view of a particularly advantageous version of a connection between two adjacent shafts in an upper region of the storage frame, and an enlarged view of a portion of an offset between the shafts.

Since the lateral surfaces of the walls 44–47 of the shafts 4 are crimped outward, these side walls 44–47 are set back in the region of their longitudinal edges 42, as viewed from the center point of the empty position surrounding them, thereby practically precluding the danger of the connecting elements welded there catching on a fuel assembly as the shafts 4 or spaces 5 are loaded and unloaded. In FIG. 7, the offset S1, S2 is shown on a larger scale in a location vector diagram. A resultant location vector S is equal to a spacing or gap between the two longitudinal edges 42a, 42b.

The width d of the striplike first and second connecting elements 20 and 26 is approximately from 10 to 30% of the clear span c of a shaft 4, and in this example is 60 mm. The wall thickness of the connecting elements 20, 26 is preferably from 50% to 90% of the wall thickness of the shafts 4. In the exemplary embodiment of this figure, a wall thickness of the connecting elements 20, 26 of approximately 1.5 mm is provided for a wall thickness of the shafts 4 of 2 mm.

Figure 3:
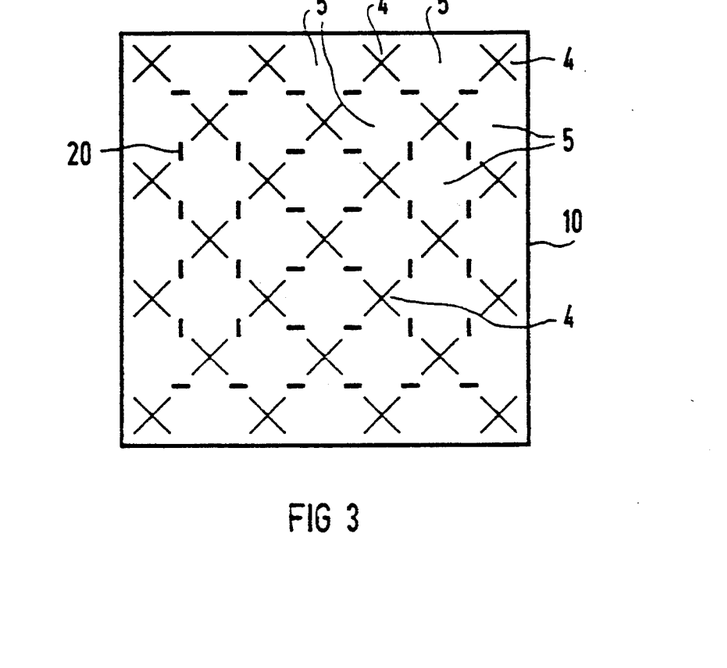
FIGS. 3 and 4 are schematic views showing a geometric configuration of first and second connecting elements in the storage frame.

FIG. 3 shows a preferred configuration of the first striplike connecting elements 20. An X indicates the positions in the storage frame that are provided with shafts 4 in the figure. The first connecting elements 20 are each disposed with their flat side parallel to the closest part of the outer wall 10 of the storage frame, producing a pattern that resembles an onionskin in its layout.

Figure 4:
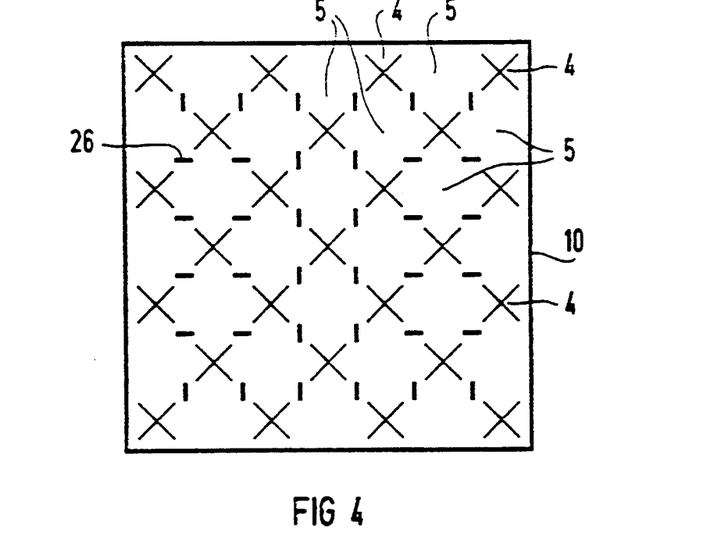

FIG. 4 shows the configuration of the second connecting elements 26 in the upper region of the storage frame. It can be seen from the drawing figures that the second striplike connecting elements are disposed virtually at right angles to the respective closest part of the outer wall 10 of the storage frame. In order to connect two diagonally opposed shafts, at least two connecting elements are therefore provided for each longitudinal edge adjoining one another, and these connecting elements have a high rigidity in directions virtually orthogonal to one another. Through the use of this construction, high rigidity of the storage frame in the presence of strains in arbitrary directions that are parallel to the base plate, is effected.

If the storage frame is used in a region or zone of reduced seismic strain or where earthquakes are unlikely, it may be that the use of first and second connecting elements 20 and 26 to join the diagonally opposed shafts 4, may only be required for some of these connections.

Figure 5:
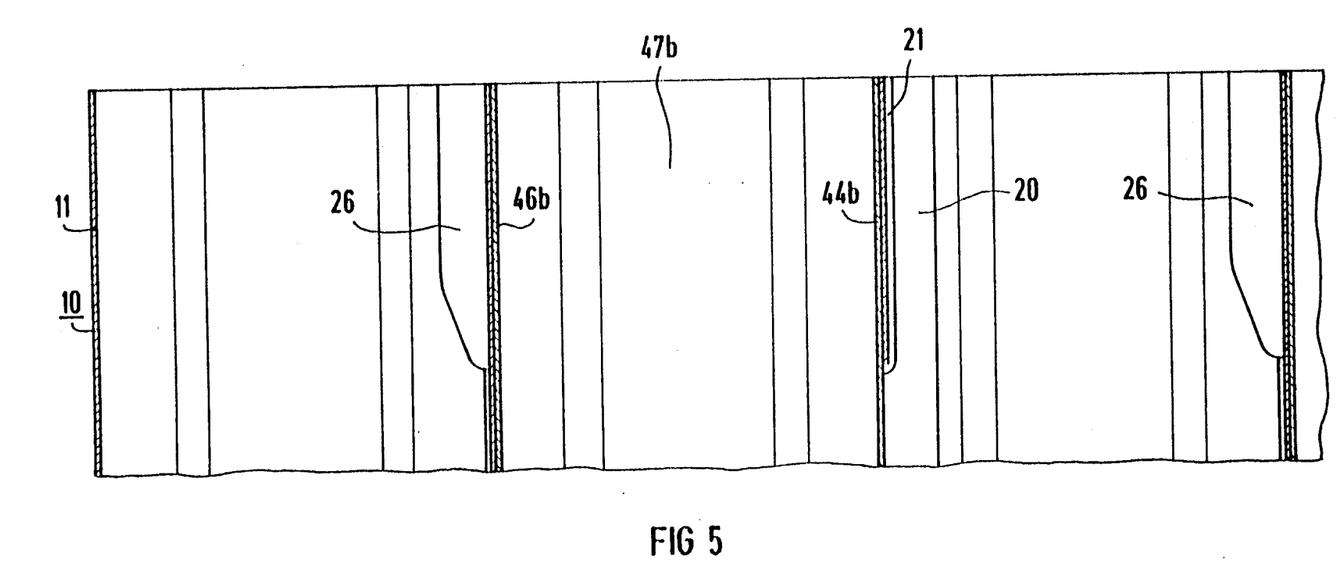
FIGS. 5 and 6 are fragmentary, cross-sectional views each showing an upper portion of a storage frame with different connecting elements.

In FIG. 5, it can be seen that the first connecting elements 20 extend up to the upper edge of the shafts 4. The upper regions of the first connecting elements 20 are provided with a groove or recess 21 for receiving the second connecting element 26. The second connecting elements 26 have a shape which tapers or converges to a point on the end thereof facing away from the end surface of the shafts 4, so that they will not catch on the fuel assemblies upon unloading.

Figure 6:
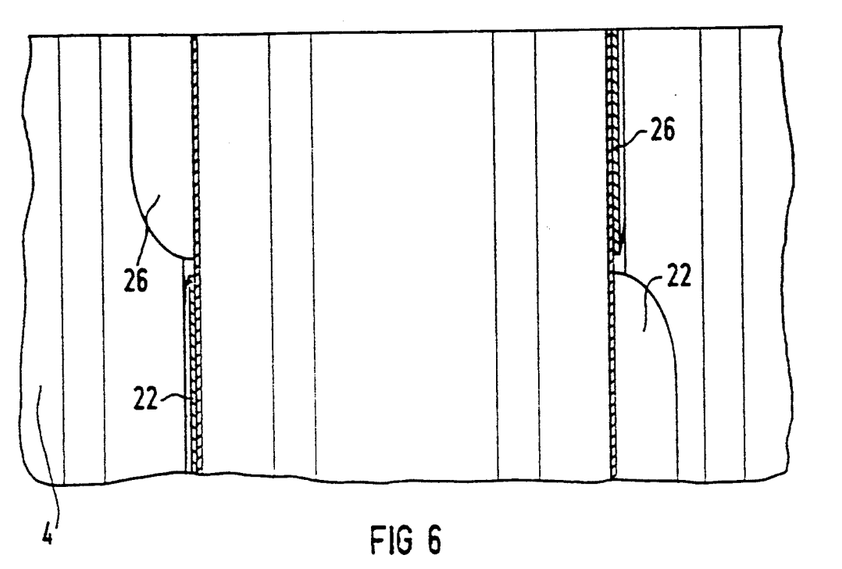

In contrast to the embodiment of FIG. 5, first connecting elements 22 which are provided in FIG. 6 extend only within the lower region 6 of the shafts 4 rather than to the upper edge thereof. These first connecting elements 22 likewise have a shape which tapers or converges to a point on the free end thereof that protrudes into the interior of the shaft, in order to prevent them from catching on the fuel assemblies during loading with the first connecting elements 22. In principle, the structure of the second connecting elements 26 is as shown in FIG. 5.

FIG. 7 not only serves to explain the offset S1, S2 but also shows an advantageous embodiment with cruciform or cross-shaped second connecting elements 28, which are welded to the lateral surfaces of the walls 44a, 45a and 46b, 47b of the respective shafts 4a and 4b that face toward one another. It can be seen in this figure that in this exemplary embodiment as well, the various flat sides of the cruciform second connecting element 28 extend at an acute angle β relative to the lateral surfaces of the walls 44a, 45a, 46b and 47b of the respective shafts 4a and 4b.

Since the second connecting elements 28 are disposed only in the upper region of the storage frame, their installation can be performed afterward from above. The cruciform connecting elements 28 can be welded in from above between the shafts 4 as separate pieces having the height or length b seen in FIG. 1. Alternatively, however, they may be created by welding the first connecting elements 20, which extend across the height a+b and are slit at the top as in FIG. 5, to the second connecting elements 26 that are also shown there, or alternatively the short second connecting elements, in two longitudinally split halves, can be welded to slit first connecting elements having the length a+b.

Figure 8:
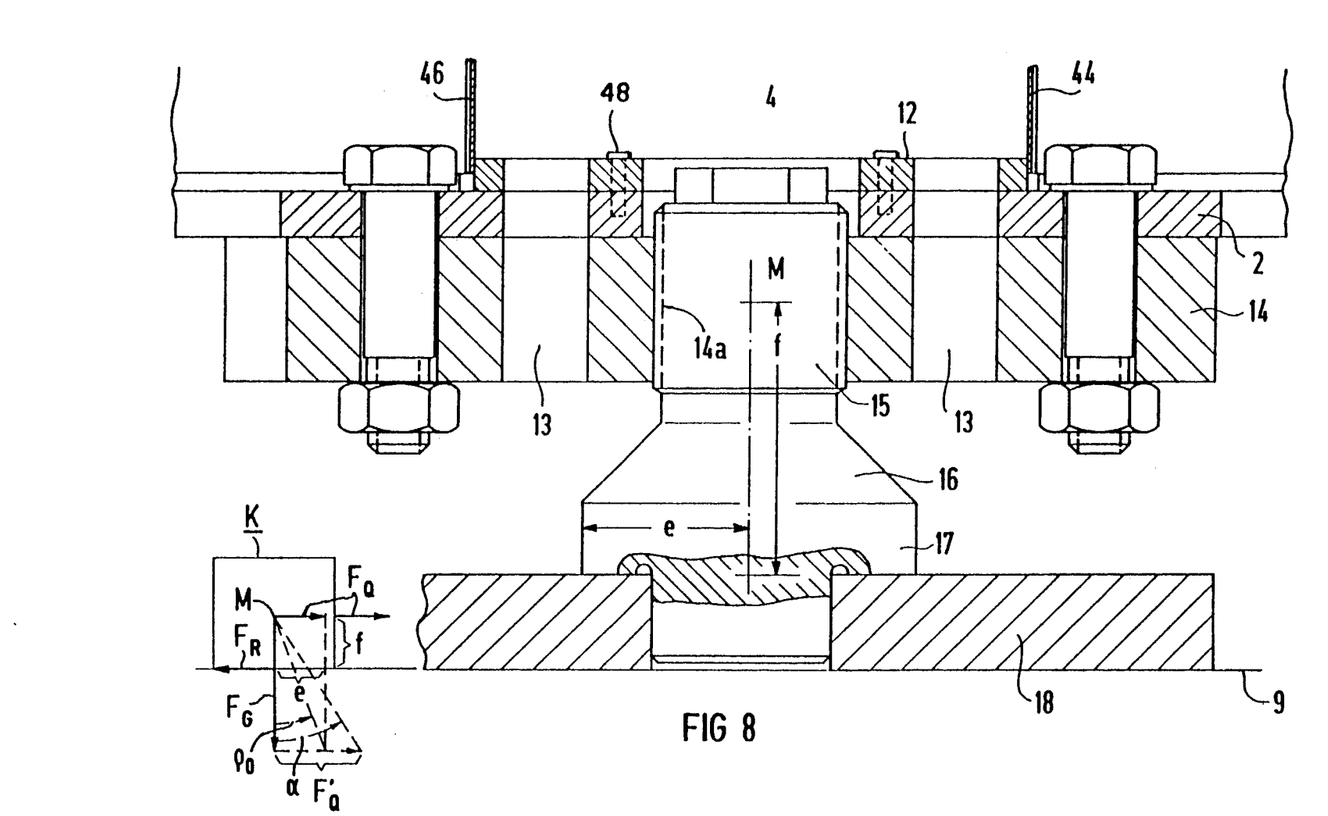
FIG. 8 is a fragmentary, vertical-sectional view of a further portion of a support foot for supporting the storage frame on a pit bottom.

In FIG. 8, the base plate 2 is screwed together with the reinforcement plate 14, which has a bore 14a with a female thread. The foot 16 has a threaded shank 15 which is screwed into the bore 14a. A coarse thread with an axial play of at least 0.5 mm and preferably 1 to 2 mm is provided for the screw fastening having the bore 14a and the shank 15. The foot 16 has a base 17 which is widened in comparison with the threaded shank 15 and rests on the bottom plate 18, which in turn rests on the bottom 9 of the storage pit. A ratio between a half-width e of the base 17 and a spacing f between a bearing surface of the foot 16 and a center point M of the threaded bore 14a, is greater than the coefficient of static friction $\mu$ between the bottom plate 18 and the bottom 9 of the storage pit, in order to enable sliding of the entire storage frame on the bottom 9 of the pit in the event of transverse forces acting upon the storage frame. This prevents tilting of the feet 16. In order to explain the forces and moments that arise, a cube-shaped body K is shown resting on the bottom 9 in the left-hand portion of FIG. 8. The body K is engaged in the region of its center of gravity M by a horizontal force $F_Q$ having a lever arm f and a weight-force $F_G$ having a lever arm e. A frictional force $F_R$ acting in the plane of the bottom 9 is oriented counter to the horizontal force $F_Q$, and if the body K is at rest, then $F_Q = F_R$. tilting moment $N_Q$ is defined by $$N_Q = f \cdot F_Q \tag{1}$$

A static moment N is defined by $$N_G = e \cdot F_G \tag{2}$$

If tilting is not supposed to occur then the following equation applies:

$$N_G > N_Q \tag{3}$$

that is, $$e \cdot F_G > f \cdot F_Q \tag{4}$$

It is also true that $$F_Q = \mu \cdot F_G \tag{5}$$

or $\mu = F_Q/F_G$, because the frictional force $F_R$ in the limit case in question (limit angle $\rho_0$) is equal to the horizontal force $F_Q$ coefficient of friction).

The following known relationship applies for the frictional force:

$$F_R = \mu \cdot F_G \tag{6}$$

that is, $$\mu = F_R/F_G$$

The inequality (4) can therefore also be written as follows:

$$eF_G > f \cdot \mu \cdot F_G \tag{7}$$

from which the aforementioned relationship $$e/f > \mu \tag{8}$$

results as a prerequisite for the condition "no tilting of the body K". With this prerequisite, an increase in $F_Q$, for instance to a value $F'_Q$, would lead to sliding. An angle $\alpha$, which belongs to $F'_Q$, or to the resultant from $F'_Q$ and $F_G$, is larger than the limit angle $\rho_0$, which likewise means that sliding occurs, but no tilting, because $\tan \rho_0 = \mu < \tan \alpha$.

It can also be seen from FIG. 8 that the side walls 44 and 46 of the shafts 4, as well as the side walls 45 and 47 that are not visible in this figure, are welded to a flange plate 12, which is secured to the base plate 2 by screws 48. The reinforcement plate 14, the base plate 2 and the flange plate 12 are each provided with coolant bores 13, through which coolant for dissipating the afterheat of the fuel assemblies is removed.

We claim:

1. A storage frame for nuclear reactor fuel assemblies, comprising:
   a) a base plate;
   b) a plurality of shafts standing erect on and being secured to said base plate, said shafts each having a substantially rectangular cross section and being disposed diagonally opposite one another in a checkerboard-type configuration, and said shafts having mutually parallel side walls and having longitudinal edges adjacent one another with an offset defining a gap therebetween; and
   c) at least two connecting elements joining at least some of said diagonally opposite shafts together along said longitudinal edges by spanning said gap;
   d) said at least two connecting elements including at least one first connecting element bridging a respective pair of said longitudinal edges of two of said shafts, said first connecting element being a sheet-metal strip and being welded to a first pair of said mutually parallel side walls of said two diagonally opposite shafts; and
   e) said at least two connecting elements including at least one second connecting element bridging the respective pair of said longitudinal edges of said two diagonally opposite shafts, said second connecting element being a sheet-metal strip and being welded to a second pair of mutually parallel side walls of said two diagonally opposite shafts;
   f) said first connecting element having a relatively higher rigidity in a first direction and a relatively lower rigidity in a second direction, said second connecting element having a relatively higher rigidity in the second direction and a relatively lower rigidity in the first direction, said first direction being defined by a horizontal transverse force acting substantially parallel to flat side of said first connecting element, and said second direction being defined by a horizontal transverse force acting substantially parallel to flat side of said second connecting element.

2. The storage frame according to claim 1, wherein the first direction and the second direction enclose an angle between 70° and 90°.

3. The storage frame according to claim 1, wherein said shafts have upper and lower regions and side walls, said first connecting elements are disposed in said lower regions and are each welded to one of said side walls of one of said shafts and to one of said side walls of another of said shafts disposed opposite said one shaft, and said second connecting elements are disposed in said upper regions and are each welded to another of said side walls of one of said one shafts and to another of said side walls of another of said shafts disposed opposite said one shaft.

4. The storage frame according to claim 3, wherein said shafts have a total height, and said lower region has a length being at least three-quarters of said total height.

5. The storage frame according to claim 1, wherein said connecting elements have flat sides each being disposed at an acute angle relative to a respective one of said side walls welded thereto.

6. The storage frame according to claim 1, wherein said shafts have a total height, and said first connecting elements extend over said total height and each have a slit formed therein in said upper region for receiving one of said second connecting elements.

7. The storage frame according to claim 1, wherein said shafts have a clear span, and sheet-metal strips have a width of between 10% and 30% of said clear span.

8. The storage frame according to claim 1, wherein said first and second connecting elements together form a combined connecting element having a cruciform profile and are each welded to two interconnected side walls of a respective one of said shafts.

9. The storage frame according to claim 1, wherein said shafts have an interior, and said connecting elements have tapered converging ends protruding axially from outside into the interior of said shafts.

10. The storage frame according to claim 1, wherein said shafts are formed of austenitic boron steel with a boron content of up to 2%, and said connecting elements are formed of soft austenitic steel with a carbon content of less than 0.1%.

11. The storage frame according to claim 10, wherein said shafts have side walls with a wall thickness, and said connecting elements have a lesser wall thickness than said side walls.

12. The storage frame according to claim 1, wherein said shafts have a clear span and side walls with outwardly directed crimps so as to make up for an offset between said longitudinal edges of mutually adjacent shafts and for defining a clear span of spaces surrounded by said shafts substantially identical to said clear span of said shafts.

13. The storage frame according to claim 1, wherein said diagonally opposite shafts have spaces therebetween defining intermediate positions, and including an outer wall surrounding said shafts and said spaces, said first connecting elements each being disposed parallel to a part of said outer wall to which they are closest, producing an onionskin-like pattern.

14. The storage frame according to claim 1, including a flange plate being screwed to said base plate, said shafts being welded to said flange plate.

15. The storage frame according to claim 14, including supporting feet being screwed to said base plate.

16. The storage frame according to claim 14, including reinforcement plates attached to said base plate, and supporting feet being screwed to said reinforcement plates.

17. The storage frame according to claim 16, wherein said reinforcement plates have threaded bores formed therein with a coarse thread for screwing in said feet having an axial play of at least 0.5 mm.

18. The storage frame according to claim 17, including a bottom plate, said feet each having a threaded shank and a base being wider than said shank and being supported on said bottom plate; and clamping devices disposed between said bottom plate and said reinforcement plate for bracing said feet in said coarse thread after adjustment of a horizontal position of said base plate.

19. The storage frame according to claim 18, wherein a ratio between half the width of said base of each of said feet and a spacing between said bottom plate and a center point of said threaded bore, is greater than a coefficient of static friction between said bottom plate and a bottom of a storage pit.

* * * * *